No. 796,593. PATENTED AUG. 8, 1905.
J. E. MOHAN.
PORTABLE OVEN.
APPLICATION FILED MAR. 30, 1905.
2 SHEETS—SHEET 1.
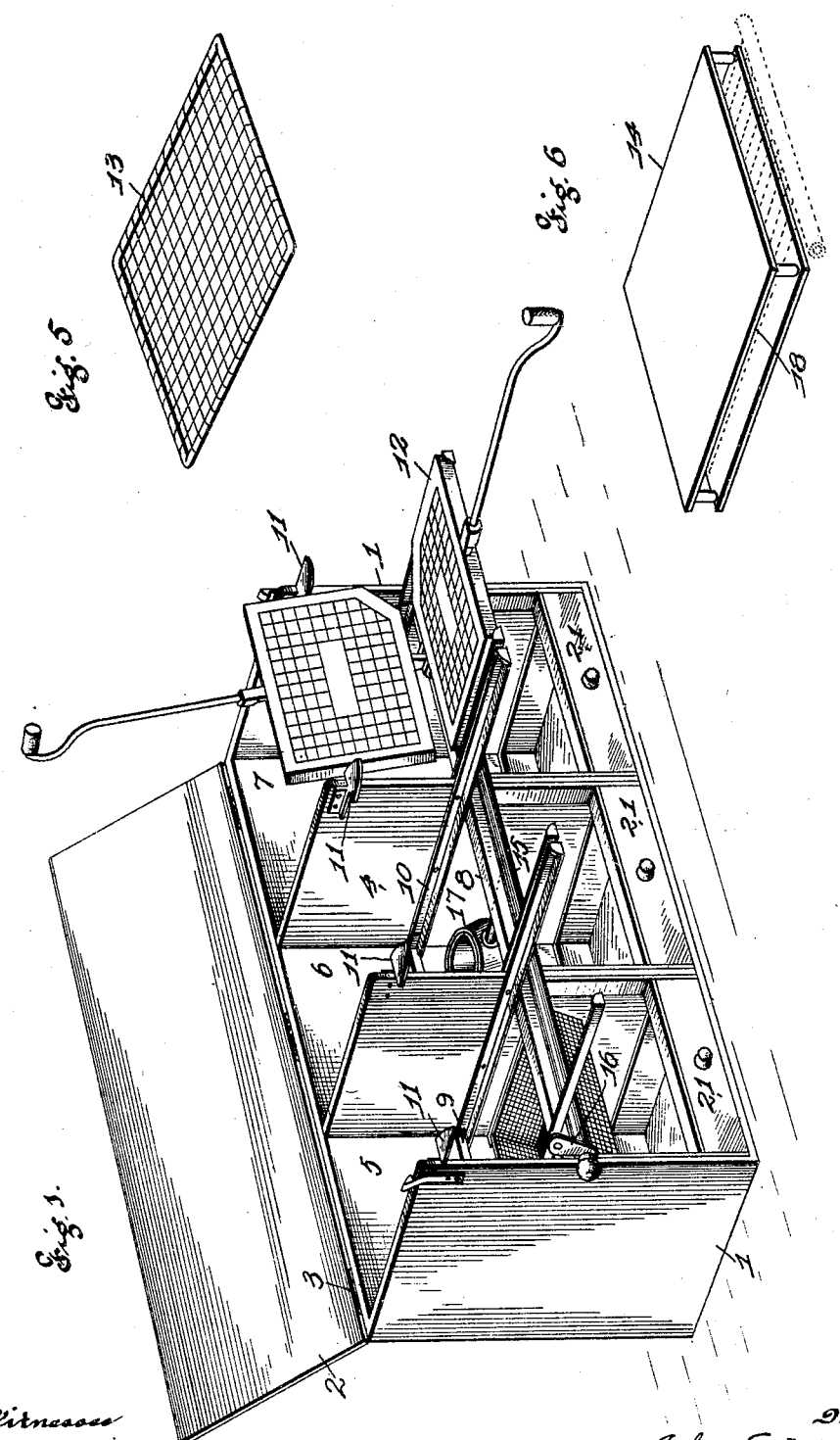

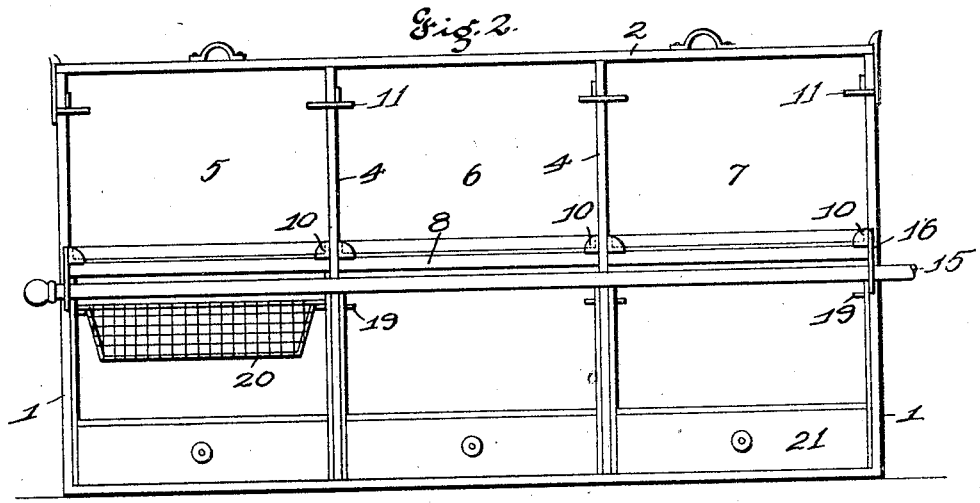
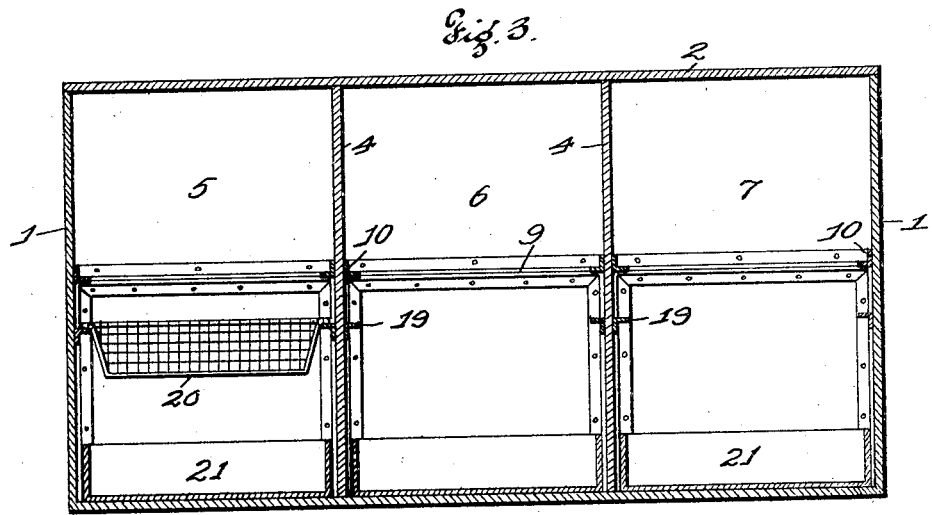
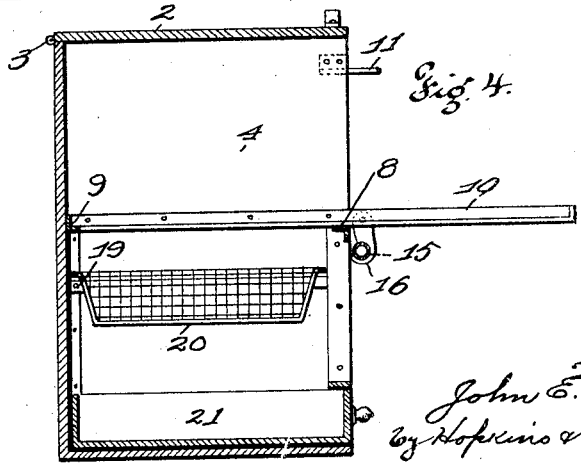

UNITED STATES PATENT OFFICE.

JOHN E. MOHAN, OF ST. LOUIS, MISSOURI.

PORTABLE OVEN.

No. 796,593.  Specification of Letters Patent.  Patented Aug. 8, 1905.

Application filed March 30, 1905. Serial No. 252,914.

*To all whom it may concern:*

Be it known that I, JOHN E. MOHAN, a citizen of the United States, and a resident of St. Louis, Missouri, have invented certain new and useful Improvements in Portable Ovens, of which the following is a specification containing a full, clear, and exact description, reference being had to the accompanying drawings, forming a part hereof.

My invention relates to improvements in portable ovens, and has for its object to provide a light and readily-portable oven capable of being heated by gas or charcoal and primarily adapted for use in the open air.

In the drawings, Figure 1 is a perspective view of the oven of my invention. Fig. 2 is an elevational view of the same. Fig. 3 is a longitudinal vertical view in mid-section of the same. Fig. 4 is a transverse vertical view in mid-section of the same. Fig. 5 is a perspective view of the broiler intended for use in the oven of my invention. Fig. 6 is a perspective view of the griddle employed for the oven of my invention.

In the drawings, the numeral 1 indicates the outer casing of my oven, having a bottom, sides, and back. To the upper edge of the back the cover 2 is pivotally attached by means of the hinges 3. The casing 1 is divided into any desired number of compartments by means of the partitions 4, the compartments in the drawings being indicated by the numerals 5, 6, and 7. At the front of the casing 1 I have provided a horizontal bar 8, which is in alinement with a corresponding bar 9 upon the inner face of the back of the casing 1. Each side of the compartments 5, 6, and 7 is provided with a slide 10, which is in the form of an angle-bar, as shown in the drawings, and which extends from the bar 9 over the bar 8 and projects from the front of the casing 1, as shown in Fig. 1. The side of each of the compartments 5, 6, and 7 is provided at or near its top with the guide-blocks 11. The slides 10 are adapted to carry the waffle-iron 12, the broiler 13, and the griddle 14, the said waffle-iron, broiler, and griddle being removable and interchangeable. The function of the guide-blocks 11 is to support the upper half of the waffle-iron 12 when the waffle-iron is open, as shown in Fig. 1.

My oven is provided with two heating means. When it is desired to heat the same by gas, the gas-pipe 15 is employed, which is suspended from the slides 10 by means of hangers 16, and suitable gas-burners are then seated within the compartments and connected to the pipe 15, said gas-burners being either circular in form, as indicated at 17, or consisting of a system of horizontal perforated tubes, (when it is desired to heat the entire surface of a griddle,) as indicated by the numeral 18. For the purpose of using charcoal as a heating means I have provided the following mechanism: The sides of the compartments 5, 6, and 7 are provided with the horizontal slides 19, upon which the fuel basket or retainer 20 is mounted, and at the bottom of each compartment I have provided the ash-tray 21 to catch the residue falling from the basket 20.

From the foregoing description it will be seen that I have provided an oven which is readily portable and which can be heated by gas when gas-supply is attainable and by charcoal when a gas-supply is not available, whereby my oven may be employed for picnic purposes and the like and used for broiling sausages, popping corn, and baking waffles and batter-cakes and the like.

Having thus described my invention, what I claim as new, and desire to have secured to me by the grant of Letters Patent, is—

1. In a portable oven, the combination of a plurality of compartments, slides mounted horizontally in the compartments and adapted to carry cooking utensils, other slides mounted beneath and parallel with the first-mentioned slides, and a fuel-basket adapted to be carried by the last-mentioned slides, substantially as described.

2. In a portable oven, the combination of a plurality of compartments, slides mounted horizontally in the compartments and adapted to carry cooking utensils, other slides mounted beneath and parallel with the first-mentioned slides, a fuel-basket adapted to be carried by the last-mentioned slides, and ash-trays seated beneath the fuel-baskets, substantially as described.

3. In a portable oven, a plurality of compartments, slides mounted horizontally within the compartments, guide-blocks mounted at the front of the compartments, ash-trays seated in the bottoms of the compartments, cooking utensils adapted to be mounted upon the slides, and means for heating the cooking utensils, substantially as described.

In testimony whereof I have signed my name to this specification in presence of two subscribing witnesses.

JOHN E. MOHAN.

Witnesses:
 ALFRED A. EICKS,
 M. M. BRAZILL.